Figure 1:
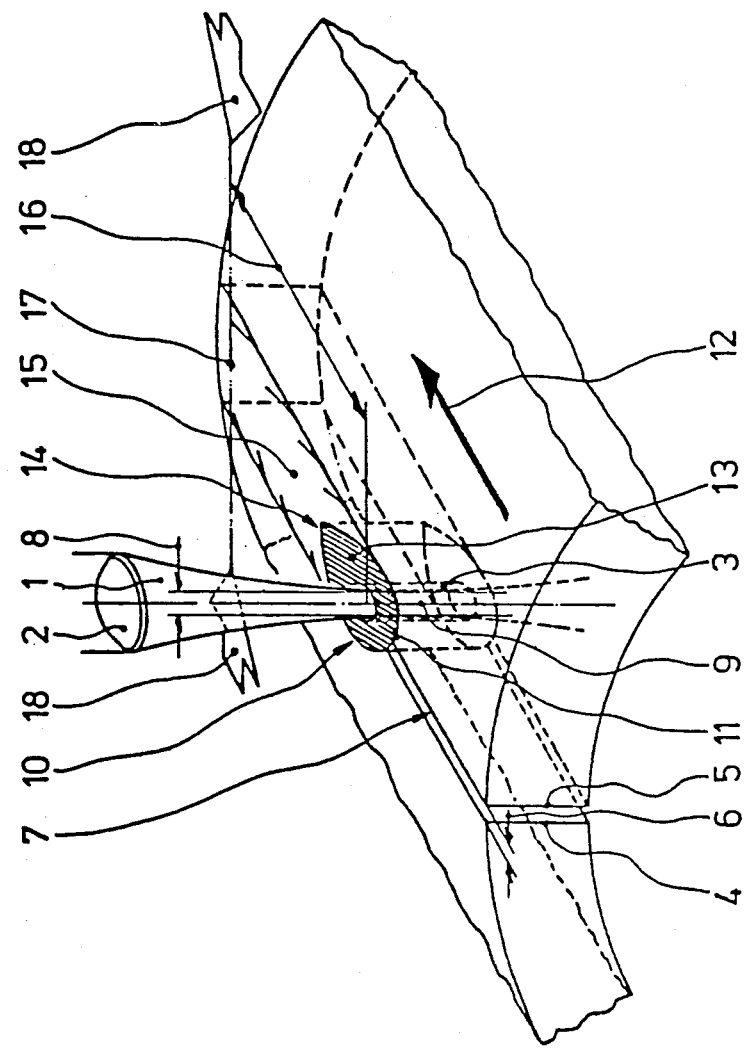

United States Patent [19]

Krebs et al.

[11] Patent Number: 4,827,099

[45] Date of Patent: May 2, 1989

[54] METHOD AND APPARATUS FOR CONTINUOUS PRODUCTION OF TUBULAR BODIES BY MEANS OF LASER LONGITUDINAL SEAM WELDING

[75] Inventors: Rolf Krebs, Hamm; Otto Welsing, Hemer; Friedhelm Retzlaff, Kamen-Methler; Friedhelm Günter, Dortmund; Hans-Jürgen Wahl, Münster; Manfred Gerber, Hamm; Heinz Gross, Dortmund-Syburg, all of Fed. Rep. of Germany

[73] Assignee: Hoesch Aktiengesellschaft, Dortmund, Fed. Rep. of Germany

[21] Appl. No.: 98,280

[22] Filed: Sep. 18, 1987

[30] Foreign Application Priority Data

Sep. 27, 1986 [DE] Fed. Rep. of Germany ....... 3632952

[51] Int. Cl.⁴ .......................................... B23K 26/00
[52] U.S. Cl. .......................... 219/121.63; 219/121.64
[58] Field of Search ................ 219/121 LC, 121 LD, 219/121 EC, 121 ED, 121 PJ, 55.1, 64, 105

[56] References Cited

U.S. PATENT DOCUMENTS

| 4,315,132 | 2/1982 | Saurin et al. | 219/121 LD |
| 4,341,943 | 7/1982 | Nilsen | 219/121 LD |
| 4,719,329 | 1/1988 | Matzuno et al. | 219/121 LD |

FOREIGN PATENT DOCUMENTS 0232676 12/1984 Japan .......................... 219/121 LD Primary Examiner—C. L. Albritton
Attorney, Agent, or Firm—Thomas S. Baker, Jr.

[57] ABSTRACT

Method and apparatus for the continuous industrial production of tubular bodies in which coated or uncoated steel strip is formed to a slit tube and the opposite strip edges are longitudinally seam welded at high speed by a laser beam of high energy density under protective gas with or without supply of additive material, and after a preparation adapted to the narrow melt zone and bringing together of the strip edges a fusion welding with subsequent controlled cooling and upsetting is carried out which results in a seam geometry suitable for any further processing.

29 Claims, 7 Drawing Sheets

METHOD AND APPARATUS FOR CONTINUOUS PRODUCTION OF TUBULAR BODIES BY MEANS OF LASER LONGITUDINAL SEAM WELDING

The invention relates to a method of making tubular bodies in which coated or uncoated steel strip is continuously formed to a slit tube and the opposite strip edges longitudinally seam welded with high speed with a laser beam of high energy density with or without supply of additive material under protective gas.

Such methods for laser welding of tubular bodies are known and are used in particular in the field of making thin-walled tubular bodies of alloyed steels or special steels. Thus, for instance, U.S. Pat. No. 4,315,132 discloses a method in which a metal strip is withdrawn from a coil and formed in a shaping funnel continuously to a slit pipe or tube whose strip edges are thereafter longitudinally seam welded with a laser beam.

However, in practice when using this method it is found that with increasing wall thickness in spite of exact positioning of the strip edges, as required in the aforementioned patent specification, and in spite of good strip edge surface preparation this type of welding without pressure on the strip edge face does not provide a satisfactory seam geometry. Due to the interaction between weld speed and a very steep temperature gradient, i.e. extremely rapid heating and cooling of the seam region and low thermal conduction to the adjacent areas, and to streams arising in the weld path in this welding method seam fallbacks form at the inner and outer surface on either side of the weld seam. Due to the partial wall thickness reduction resulting therefrom such seam fallbacks prove to be critical points in particular in the further processing of pipes or tubes by bending methods.

The method for welding abutting faces of sheet metal disclosed in DE No. 33 04 717 A1 includes an upsetting of deforming of the melt and thus of the abutting faces during the welding operation. This process also known in pipe or tube production, for example in inductive welding methods, as "pressure welding", permits a strip edge preparation which is not as involved because the part of the melt or strip edge faces containing irregularities or flaws is pressed out of the seam region and cooled in the form of an upset bead on the inner and outer surface of the seam.

In pipe or tube welding however pressing of the melt in the fluid or pasty state can however only take place in dependence upon the displacement and not in dependence upon the flaws because the fluid melt phase of the material does not permit transmission of a measurable upsetting force. This manifests itself in the uncontrolled formation of the upset bead on either side of the seam.

Furthermore, in tubes or pipes made from rolled starting material the use of such a pressure welding leads to an undesirably pronounced deflection of the material lines in the seam region.

In addition, with increasing wall thickness due to the extremely narrow seam region in laser welding in conjunction with the extremely steep temperature gradient, elimination of the material and shape flaws by upsetting is no longer possible to an adequate extent.

The invention is therefore based on the problem of providing a method which permits the industrial production of laser-beam-welded pipes or tubes of metal even with increasing wall thickness and higher speeds and makes available a seam with structure, geometry and material properties formed such that the entire seam region corresponds to the properties of the base material in all properties necessary for the use intended after production.

Proceeding from the general idea of the invention, i.e. that industrial production of laser-beam-welded pipes or tubes with a seam quality independent of the wall thickness and weld speed is only possible by modifying and breaking down a complex welding method with the aid of individually controllable functions reacting to wall thickness and weld speed changes, the method disclosed has the advantage that by an upsetting of the weld seam following the actual welding and the subsequent controlled cooling a defined predictable and controllable seam formation is obtained.

With such a method, in which the strip edges are advantageously fusion welded initially whilst retaining a slight weld gap without pressure perpendicularly to the strip edge face and after defined cooling are upset, the seam fallbacks arising in fusion welding on either side of the seam on the inner and outer surface in the transition region to the base material are eliminated. Also avoided at the same time however is a random formation, completely controlled in form and volume, of a weld bead in the inner and outer side of the seam as arises when the principle of pressure welding is applied, i.e. the upsetting of the melt in the weld point in which an upsetting force cannot be taken up by the extremely low compressive strength of the fluid metal phase.

Depth welding with the aid of the laser beam takes place with formation of a heat cylinder (keyhole) which surrounds the laser beam in the material subjected to the focus area and consists of two phases, i.e. the fused material and vaporized, electrical-charge-carrying material, the plasma.

At production speed and a defined power density of at least $0.5 \cdot 10^6$ W/cm$^2$ in the method claimed these two high-absorption phases are firmly established and the strip edges heated over the entire depth of the weld gap to the fusion temperature.

The method claimed furthermore implements the control of the upsetting displacement and/or the upsetting force in dependence upon the upset bead after the upsetting because due to the predictable uniform and always approximately circular-segment shape of the upset bead both on the inner and on the outer side the volume can be assessed even by obtaining only one measured quantity of the respective weld bead.

Depending on the dimensions the apparatus claimed is able to carry out a reliable laser welding with good seam geometry and high production speed even for tubes and pipes of large wall thickness/diameter ratio by making available all the necessary positioning means, forming means, observation systems and controls.

Fundamentally, the welding takes place under a protective gas because this advantageously influences the plasma formation and reactions of the material to oxygen in the air are avoided. Specific alloys which by the heating of the strip edges to the melting temperature undergo a change and are to be brought back to the original state, in the weld seam area as well, require the provision of additive material.

The best results as regards the weld seam geometry are obtained with the ratio of the inner to the outer upset bead volume is less than 1:3.

To assess the upset bead volumes exact information is obtained by measuring the inner and/or outer upset bead directly after the upsetting by pickup devices which in each case convert only one geometrical quantity of the upset bead to electrical pulses proportional to said quantity. This measurement takes place in tubes of small diameter advantageously with optical pickup devices because their small overall height and high degree of integration permits use for inner and outer observation. With larger pipe diameters mechanical sensing of the upset bead proves advantageous because of its simple construction and is also suitable in its reaction rate in the method disclosed here with a relatively slowly changing upset bead configuration.

With C steels and small tube diameters instead of the complex optical pickup devices inductive pickup devices are often more practical.

The particular single geometrical quantity to be measured may advantageously be the height, the width or the flank angle of the upset bead, depending on the tube dimensions and pickup device.

The simplest alternative with relatively large pipe diameters is a height measurement of the upset bead by mechanical sensors or inductive pickups. With special steel pipes of relatively large diameter optical width measurement is appropriate whilst with small special steel tubes, in particular when they are to be investigated for the formation of the inner upset bead, an optical flank angle measurement is appropriate with measuring light impinging obliquely on the upset bead.

The control of the upsetting is implemented by actuating the setting members of the particular upsetting means and advantageously a processing means is provided which compares electrical pulses proportional to the respective geometrical quantities of the upset beads and associates said pulses with a defined volume ratio for given dimensions and derives therefrom a control pulse applied to the feed members of the upset means.

Known simple constructions of such upset means exist in the form of rollers and/or roller cages or, in particular with wear-resistant materials, in the form of sliding shaping stones and/or rings.

The cooling between the fusion welding and upsetting is advantageously in the case of C steels at the most down to a temperature corresponding to the arrest point Ar 3 of the iron-carbon diagram; with special steels and austenitic steels it is at the most down to a temperature corresponding to the solidification and the dendrite formation.

When these temperature limits are observed adequate strength and thus adequate upsetting force transfer capability of the melt is obtained, simultaneously avoiding however stress freezing or the incorporation into the seam regions of structural formations favouring strain-hardening.

With a correspondingly defined relatively long cooling path it is advantageous to control the cooling rates by additional heat supply to the strip edges prior to and/or after the weld point. This makes it possible to set specific preferred temperatures for the upsetting for various materials. Also advantageous is the control of the upsetting temperature in dependence upon a reference temperature of the seam area after the upsetting because this also enables the ambient influences and changes in the weld seam area to be detected and taken into account.

As temperature measuring means advantageously a radiation pyrometer is employed which generates an electrical pulse proportional to the temperature of the seam area. With the aid of such a proportional pulse a processing means can furnish in extremely simple manner control pulses for a heating means.

As an alternative to the simple inductive heating tried for C steels by an induction coil positioned over the seam region or led round the slit tube or pipe, special steels and/or austenitic materials can be heated with the aid of laser beams.

The advantages reside in the exact heat proportioning and in the possibility with adequate power of the welding laser of coupling out a sub-beam from the laser weld beam, for example by a partially reflecting mirror, for preheating the strip edges.

A particularly simple possibility of heating is provided by thermal radiators which operated in known manner with electrical current or gas can be disposed above the seam area.

The best initial seam geometry of the fusion weld seam is obtained when the two strip edges are exposed in the laser focus region to a radiation of approximately the same intensity. With the known intensity distributions of a laser beam this is advantageously done in that the strip edges are led at an equal distance from the optical axis of the focused laser beam opposite each other. With a laser beam focus diameter between 0.2 and 2 mm this distance is as a rule between 0.04 mm and 0.25 mm.

This guiding is implemented in simple manner in that the focus point of the laser beam is adapted to the strip edges with the aid of a planar position control, the depth coordinate coinciding with the optical axis of the focused laser beam and the transverse coordinate being formed perpendicularly to the tube axis and as arc segment whose centre point lies in the tube axis and whose radius is defined by the distance of the focus point from the tube axis.

A control with such coordinates is made possible for example by a three-coordinate control, the weld gap deviation in the peripheral direction being determined as input reference quantity for positioning the focus point in the transverse coordinate by a contactless seam tracking system and converted to proportional electrical pulses. An optically operating system here has the advantage that a measurement can be made extremely precisely and independently of the external diameter and, if the deviation is determined in the peripheral direction of a marking parallel to the strip edge, even a measurement synchronously with the weld point is possible.

The distance of the tube surface at the strip edges relatively to the focus point and considered parallel to the optical axis of the focused laser beam can be converted easily into proportional electrical pulses and used as input quantity for controlling the depth coordinate by a spacing measurement. Particularly precision is provided here by a laser measuring means which also has the advantage that the measurement can be carried out in the vicinity of the weld point and that for the measurement a sub-beam coupled out of the weld beam may also be employed.

A processing unit generators in simple manner control pulses for the three-coordinate control by processing the electrical pulses of the seam tracking system and the spacing measuring system.

In laser welding, for coupling in adequate energy the strip edges are expediently brought together so close that their spacing, i.e. the gap width, is less than the diameter of the focus point. This is done in simple manner either by guide elements rolling on the tube periphery, in particular in the longitudinal direction of the tube, said elements having the known form of roller straight edges or cages, and by guide rollers.

For materials with correspondingly high wear resistance guide elements are suitable which slide on the tube periphery, particularly in the longitudinal direction of the tube, and which consist of slide guides for the strip edges and/or shaping funnels and stones.

To ensure an offset-free bringing together of the strip edges it is advantageous to control the guide elements necessary for this purpose at least in the vertical axis parallel to the offset direction, firstly determining by a measuring means the edge offset between said guide elements and the weld point and converting this to proportional electrical pulses.

It is advantageous to use here a light section measuring means which apart from a fast measuring frequency also permits a right-reading interpretation of the strip edge offset.

In combination with position sensors converting the respective position of the guide elements for guiding the strip edges in the offset direction to proportional electrical pulses, a processing means easily generates the control pulses for these guide elements. In expedient manner corresponding position sensors are constructed as potentiometers. The processing means also converts the electrical pulses of the weld gap width measurement to control signals for the guide elements which move the strip edge faces up to each other.

Furthermore, a precise fusion welding is advantageously achieved by a strip edge preparation which leads to a mean roughness depth of the strip edge faces which is less than half a beam diameter and adjacent the focus diameter of the laser beam in the weld point. Said beam diameter depends on the focusing degree of the laser beam which in turn is set in the dependence upon the wall thickness.

The strip edges are prepared in simple manner by a cutting machining, i.e. by planing, grinding or milling of the strip edge faces in one operation in a strip edge preparing unit equipped with corresponding tools or in a plurality of cutting working steps successively refining the surface of the strip edge.

A strip edge preparation can be implemented with little expenditure by upset deformation perpendicular to the strip edge faces with the aid of a corresponding upsetting means. With a roller and/or cage deformation of the strip this is expediently done by integrated cutting disc sets.

Also advantageous is the preparation of the strip edges by the laser cutting technique which is distinguished by particularly low mean roughness depth of the cut faces. Apart from separate laser cutting units, with an adequately powerful laser welding apparatus it is also possible to couple a sub-beam out of the welding beam and use it to cut the strip edges.

Figure 2:
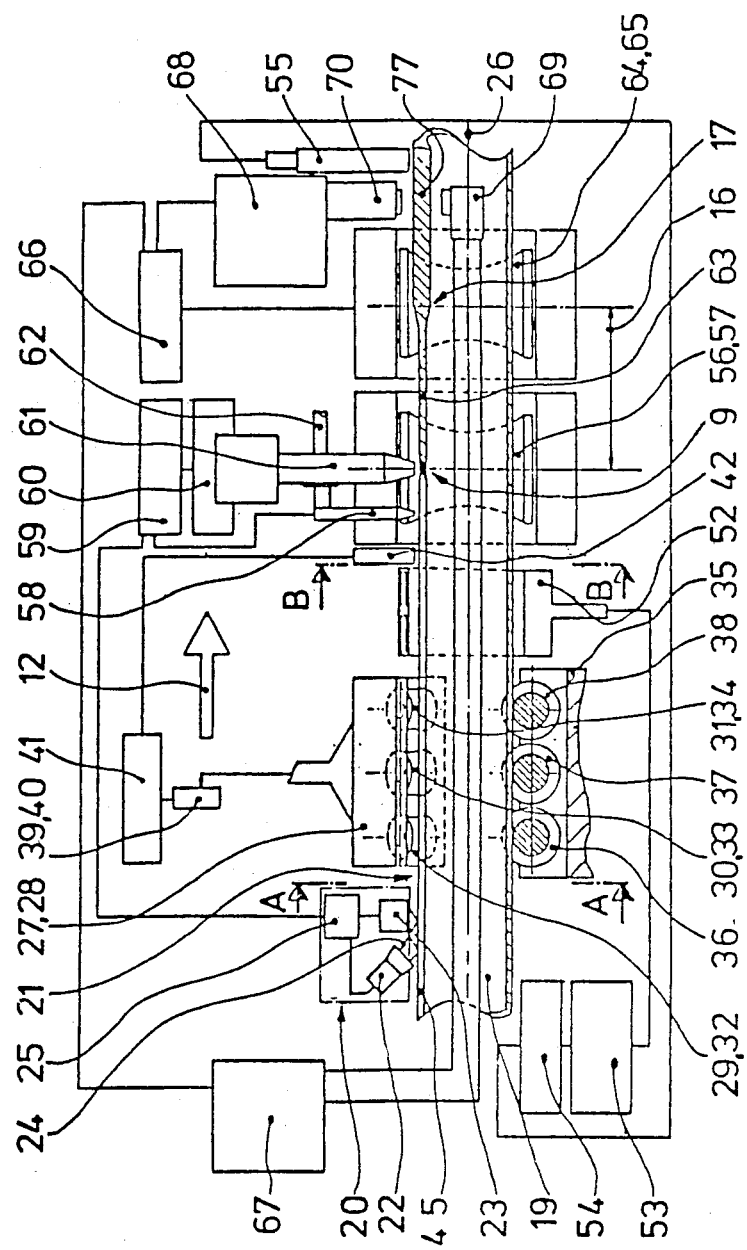
Figure 3A:
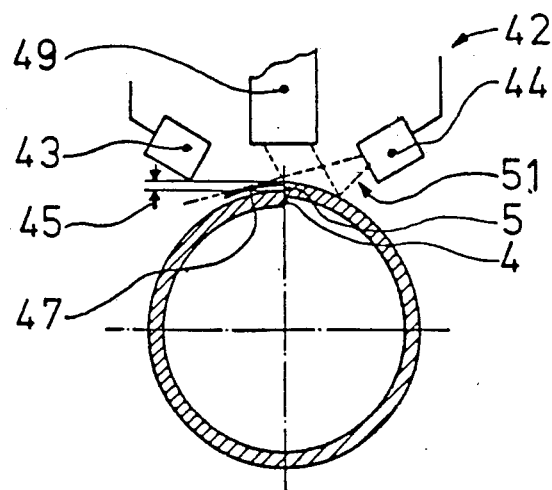
Figure 3B:
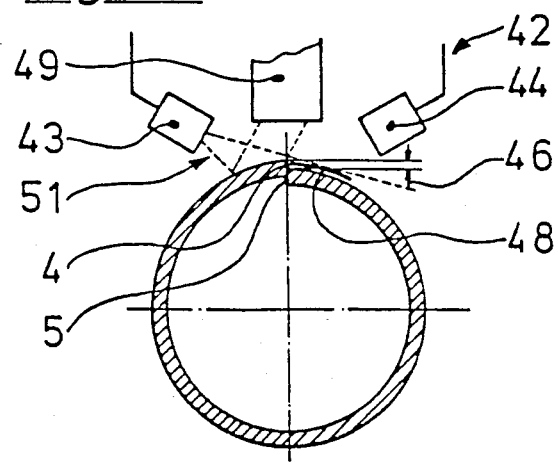
Figure 3C:
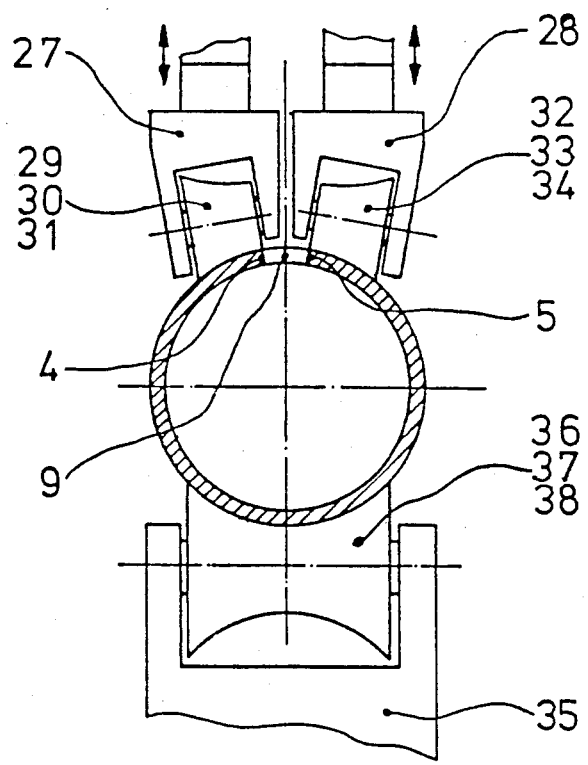
Figure 4A:
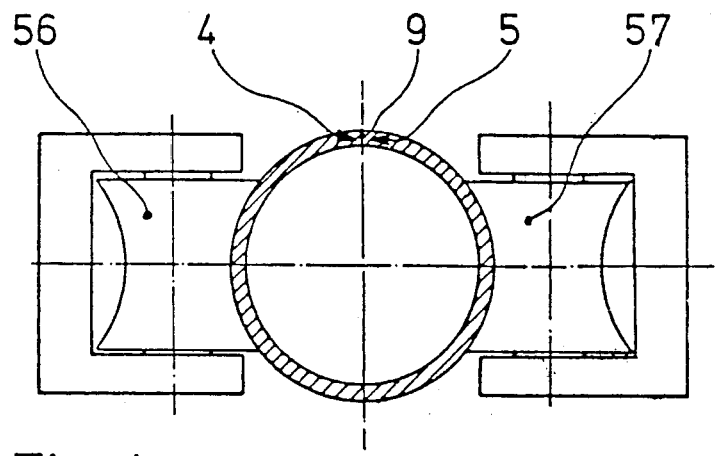
Figure 4B:
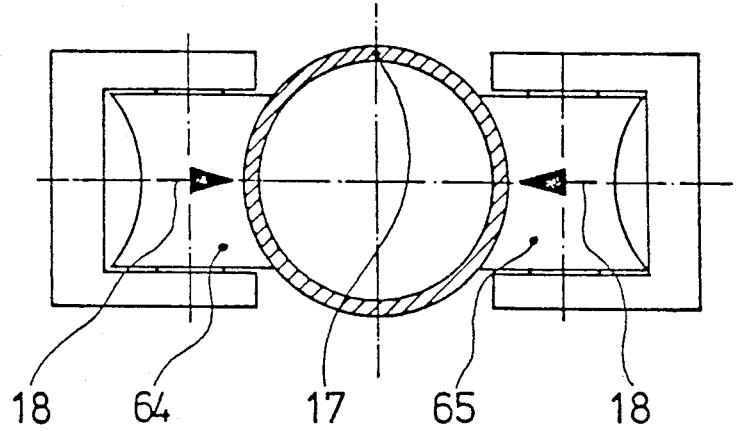
Figure 5:
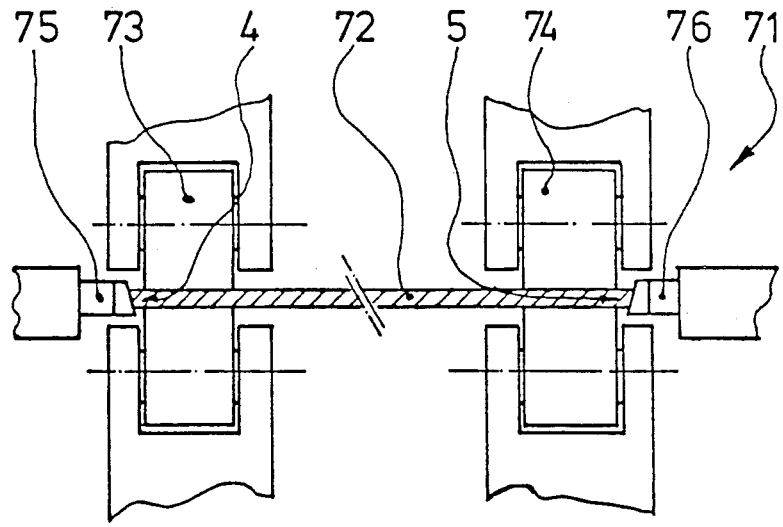
Figure 7:
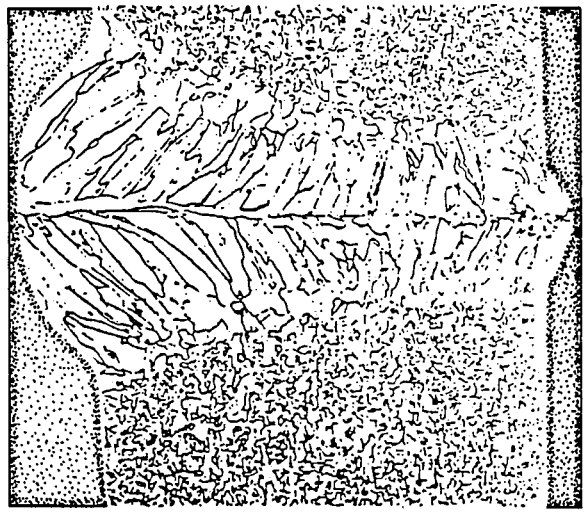
Figure 6:
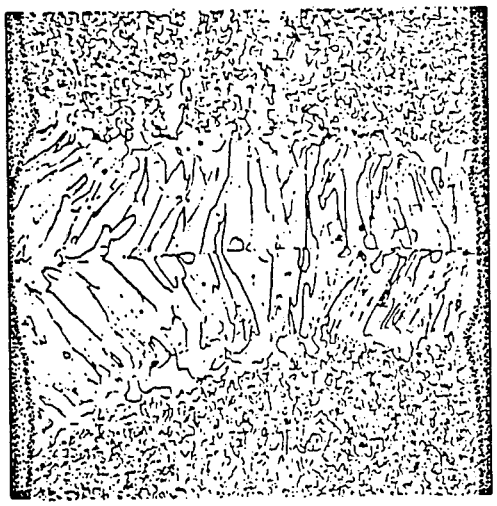

The invention will be explained in detail with the aid of an example of embodiment illustrated in the drawings, wherein:

FIG. 1 is a basic sketch for explaining the method according to the preamble and for illustrating the conditions in the laser weld point, FIG. 2 is a schematic illustration of a laser welding apparatus for carrying out the method according to the preamble, FIGS. 3a and 3b are schematic representation of the light section measuring method for determining the edge offset, FIG. 3c is a schematic cross-section along the line A—A of FIG. 2, FIG. 4a is a basic illustration of the weld spot or point in section, FIG. 4b is a basic illustration of an upset point in section, FIG. 5 is a schematic illustration of a strip edge preparation means, FIG. 6 is the micrograph of the seam region of a ferritic special steel after the laser fusion welding, FIG. 7 is the micrograph of the seam region of the same ferritic special steel after cooling and subsequent upsetting.

The basic sketch (FIG. 1) shows a laser beam 1 which is focused with the aid of a lens 2 and comprises in the weld point a power density between $0.5 \times 10^6$ W/cm$^2$ and $5 \times 10^7$ W/cm$^2$. This makes possible by forming a heat cylinder 3 (keyhole) surrounding the laser beam in the material a deep welding of the strip edges 4 and 5. The gap width 6 of the welding gap 7 is less than the focus diameter 8 of the laser beam 1 in the weld point 9. The drop-shaped melt bath 10 melts at its front edge 11 the strip edges 4 and 5 running in the feed direction 12. The melt 13 (hatched) solidifies in a rear edge zone 14 of the melt bath 10.

The further solidifying weld seam 15 then passes through the cooling path 16 up to the upsetting point 17 and the upsetting representing by the force arrow 18.

FIG. 2 shows the schematic illustration of a laser welding apparatus for carrying out the method according to the preamble explained with reference to the basic sketch 1.

The strip material bent in known manner by a roller and/or cage deformation to form the slit pipe 19 and having a strip thickness of 5 mm has already passes through a strip edge preparation, not illustrated here, by planing and subsequent fine grinding of granulation 120 and has in the faces of the edge strips 4 and 5 a mean roughness depth of $Rm = 40$ μm.

In this case a ferritic special steel of quality X 5 CV Ti 12 is welded to form a steel tube having a diameter $DA = 63.5$ mm.

A contactless operating seam tracking system 20 comprises in known manner of a light source 22 incident on the slit tube surface 21 obliquely to the feed direction 12 and a television camera 23 which is positioned above the weld gap 7 and which with the aid of the light rays 24 reflected by the tube surface 21 or absorbed in the weld gap 7 picks up a contrast-rich video image, and an evaluation unit 25.

For picking up the weld gap deviation in the peripheral direction as required here for transverse coordinate control of the focus point 9 an industrial television camera suffices which picks up a binary image as field transversely of the tube axis 26 of for example $512 \times 256$ pixels without grey gradations.

The evaluation unit 25 processes the amplitudes of the video signals received in known manner with the aid of a threshold corresponding to the mean brightness value which makes adequately precisely the distinction between reflection and absorption of the light rays 24. The displacement of the contrast boundary, i.e. the boundary between reflecting and absorbing face of the workpiece, is made available for further processing after electronic determination of the area centre of gravity of the contrast difference by an analog voltage Ug proportional to the weld gap deviation in the peripheral direction. Each of the strip edges 4 and 5 is guided outwardly by roller straight edges 27 and 28 (FIG. 3c) with the aid of calibrated rollers 29–34. The roller linear guides 27 and 28 are vertically adjustable perpendicularly to the tube axis 26 and obtain their supporting force from the support roller unit 35 with the prism rollers 36, 37 and 38. The magnitude of the set height of the roller guides 27 and 28 is detected via the respective potentiometers 39 and 40 (FIG. 2) and supplied as proportional analog voltage Ur to the processing unit 41.

The light section measuring means 42 detects the offset of the strip edges 4 and 5 and the weld gap width 6 before the weld point 9. FIGS. 3a and 3b show fundamentally the mode of operation of the light section measuring means 42 with the two light sources 43 and 44 positioned on the left and right of the weld gap 7 and alternatively with a frequency greater or equal to 3 Hz illuminating the weld gap 7 obliquely to the strip edges 4 and 5 and perpendicularly to the tube axis. Depending on the nature of the strip edge offset 45 and 46 the shaded areas 47 and 48 form which are detected by the diode line camera 49 on the basis of the differently reflected light beams 50 and 51. The weld gap also provides a shaded or absorption area corresponding to its width. The diode line camera 49 having a resolution of up to 3000 pixels per line converts the length of the shade areas 47 or 48 proportional to the height of the strip edge offset 45 and 46 respectively to an analog voltage Ub which is supplied to the processing unit 41. In the same manner a voltage US proportional to the width of the weld gap is supplied by the camera 49 to the processing unit 41. After processing and comparison with the voltage Ur proportional to the vertical position of the roller guide members 27 and 28 the processing unit 41 generates a control voltage which is supplied to the servomotors, not shown here, for the vertical adjustment of the roller guides 27 and 28.

FIG. 2 shows in the further course of the production apparatus the induction coil 52 which is operated via the centre frequency generator 53. The centre frequency generator 53 is controlled in its power by a processing means 54 which receives from the radiation pyrometer 55 measuring the seam temperature after the upsetting point 17 and thus determining the preheating of the strip edges 4 and 5 an analog voltage Ut proportional to said temperature and converts this to a control voltage for the middle frequency generator 53.

The weld guide rollers 56 and 57 guide the slit tube 19 in the weld point 9 without however exerting any pressure on the strip edges 4 and 5 perpendicular to the strip edge face (FIG. 4a), maintaining a welding gap 6 of 0.3 mm width. The feed of the weld guide rollers 56 and 57 is controlled by servomotors which are not shown here and the control voltage of which is made available by the processing means 41 after processing of the proportional voltage US.

For the depth coordinate control of the weld point 9 corresponding to the laser focus point a measuring laser 58 measures the distance, parallel to the optical axis of the focused laser beam, of the slit tube surface at the strip edges 4 and 5 relatively to the weld point 9. The spacing measurement is carried out by the known triangulation method in which a laser beam is directly obliquely onto the surface of an object, reflected and received again. With the aid of a line camera the distance between the starting point of the measuring beam and reception point of the reflected beam is evaluated and is directly proportional to the distance from the surface of the object and is passed in the form of an analog voltage Ul as input signal to the processing unit 59. After further processing of the analog voltage Uq from the evaluation unit 25 proportional to the movements of the strip edges in the peripheral direction the processing unit 59 furnishes control voltages for the electrical drives, not shown here, of the three-coordinate control 60 of the laser welding head 61.

The laser welding head 61 comprises a protective gas supply means 62 via which the protective gas is supplied to the weld point 9 through an annular chamber which is not shown and surrounds the laser beam in the laser welding head 61.

The fusion-welded seam 63 passes with the feed speed through the cooling section 16 up to an upsetting point 17 where it is upset by the upsetting roller 64 and 65 perpendicularly to the weld seam thickness direction (FIG. 4b).

The feed or bringing up of the upsetting rollers 64 and 65 is effected by servomotors, not shown here, which act on adjusting spindles and obtain their control voltages via the processing means 66. For this purpose the processing means 66 evaluates and compares the analog voltages obtained from the television camera units 67 and 68 as output signals.

These analog voltages result from and are proportional to an upset bead width measurement made with the aid of the endoscopes 69 and 70 on the inner and outer sides of the seam as well as from the following processing carried out in the television camera units in accordance with the known methods referred to with reference to the seam tracking system 20 for contrast determination with the aid of a defined mean brightness threshold.

The commercially usual endoscopes 69 and 70 each have a circularly disposed optical fibre pack for observation and an encircling annularly arranged optical fibre pack for illumination of the region to be imaged.

FIG. 5 shows the strip edge preparation unit 71 in which the not yet shaped strip starting material 72 is guided by holding rollers 73 and 74 and worked at both strip edges 4 and 5 by hydraulically set planing tools 75 and 76. A slight bevelling of the strip edges 4 and 5 is effected with an angle which compensates the distortion of the strip edges resulting after the forming due to the tensile compressive stresses in the outer and inner fibres.

FIG. 6 shows a cross-section of the fusion-welded seam 63 of a tube of the dimension DA 63.5×Wd 5 mm in appropriate magnification. The ferritic special steel was used here as material. Clearly apparent are the seam fallbacks or indentations on the inner and outer side on the left and right of the seam at the junction to the base material.

FIG. 7 shows a cross-section of the seam 77 of the same tube after passing through the cooling section 16 and after the upsetting 18. The upset bead volumes on the inner and outer sides of the seam are in a ratio of about 1:10 and are completely uniformly formed over the tube length. The seam fallbacks on the inner and outer sides of the seam are completely removed by the upsetting without a substantially greater deflection of the material line compared with the fuse-welded seam 63.

The method described for relatively large wall thicknesses is of course also applicable to small wall thickness below 3 mm.

We claim:

1. An apparatus for making seamed tubular bodies from a slit tube steel strip defining a pair of strip edge faces utilizing a laser beam characterized by;
    a strip edge preparation means (71) for preparing said strip edge faces to a mean roughness depth of less than one half a beam diameter adjacent the focus diameter of said laser beam in the weld point,
    guide elements (27, 28, 56 and 57) for bringing said strip edge faces (4 and 5) together to define a gap having a width less than the focus diameter of said laser beam,
    first measuring means (42) for measuring the offset of said strip edges and the width of the weld gap between said weld point and said guide elements (27 and 28) and outputting electrical signals representing said measured offset and said measured weld gap,
    position sensors (39 and 40) for converting the instantaneous positions for said guide elements in the vertical direction parallel to the edges offset to electrical signals representing said positions,
    first processing means (41) responsive to the electrical signals output by said first measuring means (42) and by said position sensors (39 and 40) for outputting control signals to said guide elements,
    a laser weld head (61),
    a three-coordinate control means (60) for said weld head for positioning the focus point of the laser beam such that said strip edges are spaced at equal distances from the axis of said laser beam,
    a first contactless measuring system (20) for determining deviation of the weld gap and outputting electrical signals representing said deviation,
    a second contactless measuring system (58) for measuring the spacing of the tube surface at the strip edges relative to the focus point of the laser beam and outputting electrical signals representing said spacing,
    second processing means (59) responsive to said electrical signals output from said first and said second contactless measuring systems (20 and 58) for controlling three-coordinate control means (60),
    heating means (52) for heating said strip edges in the vicinity of said weld point,
    temperature measuring means (55) for measuring the temperature of the seam weld after upsetting and outputting electrical signals representing said temperature,
    third processing means (54) responsive to said electrical signals output from said temperature measuring means (55) for controlling said heating means (52),
    feedable upset means (64 and 65) for upsetting the seam region to form an upset bead,
    pickup means (67 and 68) for measuring said upset bead subsequent to upsetting and outputting electrical signals representing a geometrical quantity of said bead, and
    fourth processing means (66) responsive to said electrical signals output from said pickup means (67 and 68) for controlling the feed rate of said upset means.

2. Apparatus according to claim 1, characterized in that the guide elements (27) and (28) and (56) and (57) further comprise rollers acting on the tube periphery in the longitudinal direction of the tube.

3. Apparatus according to claim 1, characterized in that the first measuring means (42) comprises light section measuring means.

4. Apparatus according to claim 1, characterized in that the position sensors (39) and (40) comprise potentiometers.

5. Apparatus according to claim 1, characterized in that the first contactless measuring system (20) comprises an optical operating system.

6. Apparatus according to claim 1, characterized in that the second contactless measuring system (58) comprises a laser measuring means.

7. Apparatus according to claim 1, characterized in that the heating means (52) comprises an induction coil.

8. Apparatus according to claim 1, characterized in that the heating means (52) comprises a laser beam.

9. Apparatus according to claim 1, characterized in that the heating means (52) comprises a radiator.

10. Apparatus according to claim 1, characterized in that the temperature measuring means (55) comprises a radiation pyrometer.

11. Apparatus according to claim 1, characterized in that the upsetting means (64) comprises rollers.

12. Apparatus according to claim 1, characterized in that the upsetting means (64) and (65) comprise sliding shaping stones.

13. Apparatus according to claim 1, characterized in that the pickup means (67) and (68) comprise optical operating units.

14. Apparatus according to claim 1, characterized in that the pickup means (67) and (68) further comprise mechanical sensors.

15. Apparatus according to claim 1, characterized in that the pickup means (67) and (68) further comprise inductive operating devices.

16. Apparatus according to claim 1, characterized in that the guide elements are constructed as means sliding on the tube periphery of the tube longitudinal direction.

17. A method of making seamed tubular bodies from a slit tube steel strip utilizing the apparatus of claim 1 comprising the steps of:
    preparing the strip edge faces to be welded to a mean roughness depth which is less than half the focus diameter of a laser beam at the weld point,
    bringing the strip edges to an almost offset-free position so that the gap width between them is less than the diameter of the focus point,
    leading the strip edges to the same distance from the optical axis of the focused laser beam lying opposite each other through the focus region of the laser beam;
    fusion welding the edges while retaining a small and controlled weld gap without pressure perpendicular to the strip edge faces,
    passing the seam region through a cooling path for cooling to a minimum temperature corresponding with C-steels to the arrest point Ar 3 of the iron-carbon diagram, and
    subjecting the seam region to an upsetting, the upsetting displacement being controlled in dependence upon the upsetting bead volume and the upsetting bead volume being determined by measuring the upsetting bead after the upsetting.

18. The method according to claim 17, further characterized by preparing the strip edge faces to a mean roughness depth which is less than half a beam diameter adjacent the focus diameter of a laser beam in the weld point is by laser cutting.

19. Method according to claim 17, characterized in that for offset-free bringing together of the strip edges the strip edge offset before the bringing together is measured and reduced before the weld point to a maximum value of 20% of the wall thickness.

20. Method according to claim 17, characterized in that leading the strip edges through the focus region of the laser beam opposite each other at the same distance from the optical axis is affected by a planar position control of the focus point, wherein the depth coordinate coincides with the optical axis of the focused laser beam and the transverse coordinate being formed perpendicularly to the tube axis and as an arc segment whose centre point lies in the tube axis and whose radius is defined by the distance of the focus point from the tube axis.

21. The method according to claim 20 characterized in that for the transverse coordinate control the deviation of the weld gap in the peripheral direction or a corresponding position deviation of a marking parallel to said weld gap relative to the focus point is determined in a contactless manner.

22. The method according to claim 20 further characterized by contactless measuring the change in the spacing parallel to the optical axis of the focused laser beam between the tube surface and the strip edges and the focal point for depth coordinate control.

23. The method according to claim 17, further characterized by contactless measuring to obtain the weld gap width before the weld point as an input quantity for weld gap width control at the weld point.

24. The method according to claim 17, characterized by heating the strip edges to be welded adjacent the weld point in dependence upon the temperature of the weld region determined after the upsetting to thereby control the cooling rate of the seam region between the fusion welding and upsetting.

25. The method according to claim 17, characterized by measuring the upset bead height to determine the upset bead volume.

26. The method according to claim 17, characterized by measuring the upset bead width to determine the upset bead volume.

27. The method according to claim 17, characterized by measuring the flank angle of the upset bead to determine the upset bead volume.

28. The method according to claim 17, characterized by controlling the upset displacement by reference to the upset bead volume to obtain a ratio of inner upset bead volume to outer upset bead volume of approximately 1:3.

29. The method according to claim 17, characterized by passing the seam region through a cooling path for cooling to a minimum temperature for special steels to a temperature corresponding to solidification and dendrite formation.

* * * * *